United States Patent [19]
Brodie et al.

[11] Patent Number: 5,263,759
[45] Date of Patent: Nov. 23, 1993

[54] VEHICULAR WINDOW ASSEMBLY WITH WIPER SUPPORT

[75] Inventors: James L. Brodie, Hudsonville; Timothy A. Davis, Jenison, both of Mich.

[73] Assignee: Donnelly Corporation, Holland, Mich.

[21] Appl. No.: 781,066

[22] Filed: Oct. 18, 1991

[51] Int. Cl.⁵ ............................................. B60J 1/00
[52] U.S. Cl. .................................. 296/84.1; 296/93; 296/201; 15/250.19
[58] Field of Search ................. 296/84.1, 201, 93; 15/250.19

[56] References Cited

U.S. PATENT DOCUMENTS

| | | | |
|---|---|---|---|
| 2,284,844 | 6/1942 | Rappl | 15/250.19 |
| 4,139,234 | 2/1979 | Morgan | 296/84 R |
| 4,854,636 | 8/1989 | Greenhalgh et al. | 296/201 |
| 4,993,774 | 2/1991 | Greenhalgh et al. | 296/201 |
| 5,035,023 | 6/1991 | Slingerland, Jr. | 15/250.19 |
| 5,101,531 | 4/1992 | Edwards et al. | 15/250.19 |

*Primary Examiner*—Robert R. Song
*Attorney, Agent, or Firm*—Price, Heneveld, Cooper, DeWitt & Litton

[57] ABSTRACT

A window assembly for a vehicle for use in combination with at least one wiper assembly is disclosed. The wiper assembly has an arm coupled at one end to a propelling means and at an opposite end to a wiper blade assembly. The wiper assembly is adapted to traverse the window assembly between a first and second position. The window assembly includes a window panel, a gasket encapsulating at least a portion of the window panel for mounting and sealing the window panel in the vehicle, and an arresting structure extending from an upper surface of the gasket to engage the wiper assembly when in the first position.

34 Claims, 5 Drawing Sheets

VEHICULAR WINDOW ASSEMBLY WITH WIPER SUPPORT

BACKGROUND OF THE INVENTION

This invention relates to modular panel assemblies, and, more particularly, to modular window assemblies for vehicles having an arresting structure for wiper assemblies.

Wiper assemblies for vehicles, when not in use, are intended to rest along the peripheral margin of the window so as not to interfere with the driver's or occupant's field of vision. In substantially all passenger vehicles, the drive or pivot shafts articulating the wiper arms extend through a cowl panel or leaf screen or other sheet metal structure located at the base of the window. Each wiper arm has one end coupled to a pivot shaft and the opposite end coupled to a wiper blade assembly. When in the park position, the wiper blade assembly is substantially parallel to the cowl panel so as not to obstruct the driver/occupant's field of vision.

In contemporary vehicle window assemblies, the seals about the glass panels are both functional and ornamental. In certain instances, the seals or gaskets about the glass panel are sensitive to ultraviolet (UV) radiation and deteriorate under prolonged exposure. To alleviate such degradation or weathering, the gaskets or seals are coated with an opaque material such as Titan's in-mold coating (IMC) which protects the underlying gasket. However, such coatings can be mechanically removed by the abrasive action of windshield wiper assemblies contacting the gasket. The wiping action of a wiper blade over the gasket removes the UV-protective coating from the seal, thus leading to premature failure of the gasket about the windscreen panel.

In an effort to alleviate the problem of wiper arms and blades articulating beyond the park position and damaging the opaque coating of the gasket, small components have been provided which are fastened to the cowl panel, leaf screen or other sheet metal surface to engage the wiper and stop the wiper at the park position. The stop or park assemblies are small, separately manufactured items that require time to be assembled on the vehicle. Since they are separate parts, they also must be inventoried and cataloged as all the other many components used in the construction of automobiles. Moreover, such wiper stops or parks are subject to damage, inherent in the nature of the coupling and positive relief.

SUMMARY OF THE INVENTION

Accordingly, the present invention provides a panel assembly for a vehicle adapted to be traversed by a wiper assembly and includes a transparent panel having a perimeter of predetermined size and shape, a gasket extending around and encapsulating the perimeter of the panel and adapted to seal the glass panel in a vehicle. The gasket further includes an arresting structure extending from an outer surface of the gasket. The arresting structure prevents the wiper assembly from traversing the gasket and removing any UV-protective coating.

In one form of the invention, the arresting structure is an insert molded within the gasket and located along an upper edge of the gasket to engage the wiper assembly such that the wiper frame and blade element do not contact the gasket. The arresting structure may be appropriately located to engage either or both the wiper arm or the wiper frame to keep the blade element off the gasket. Moreover, the arresting structure may include a ramp or camming surface adapted to engage the wiper arm or blade element and lift the wiper assembly up, preventing the wiper blade from striking the gasket and removing any UV-protective coating.

In another form of the invention, the post-attached arresting structure includes a post-attached structure or base molded within the gasket as an insert, or inserted after the molding process in a cavity provided therein. In the latter alternative, an adhesive may be used to fix the arresting structure within the gasket.

In another form, the arresting structure is molded within the gasket and contains a shock absorber to lessen the impact with the wiper assembly when the wiper assembly moves to the park position.

The invention thus provides numerous advantages over prior known windshield wiper stops. The present assembly provides a window unit which is unified and ready for installation as a complete unit from the exterior of the vehicle. The arresting structure is a component in the gasket extending about the perimeter of the glass panel, thus reducing the need for separate parts, inventory numbers and cataloging. Moreover, since the arresting structure is provided within the gasket, no additional time is required for installation. The molded-in arresting structure is less susceptible to damage because of the characteristics inherent in molded components such as lack of fasteners, abrupt changes in relief, fulcrum points, etc.

These and other objects, advantages, purposes and features of the invention will become more apparent from a study of the following description taken in conjunction with the drawing figures.

DETAILED DESCRIPTION OF THE PREFERRED EMBODIMENTS

Figure 1:
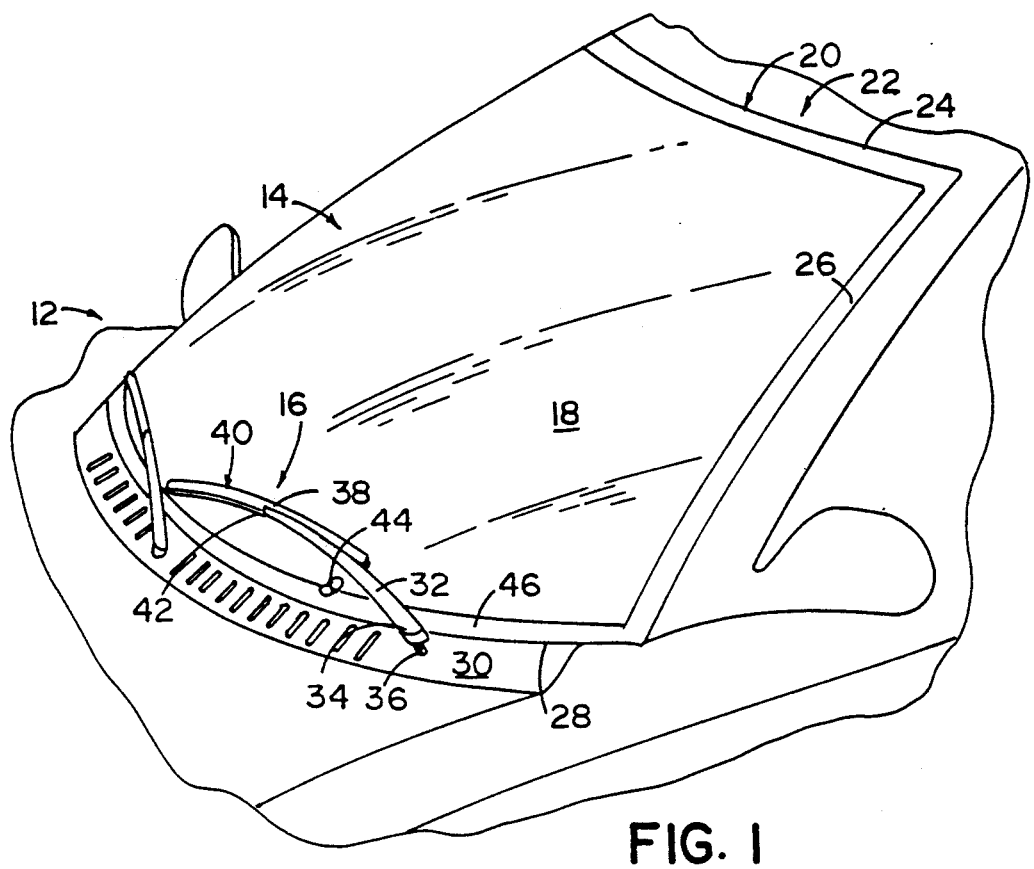
FIG. 1 is a fragmentary perspective view of a vehicle windshield installed in a vehicle incorporating windshield wiper arms and employing the present invention.
Figure 2:
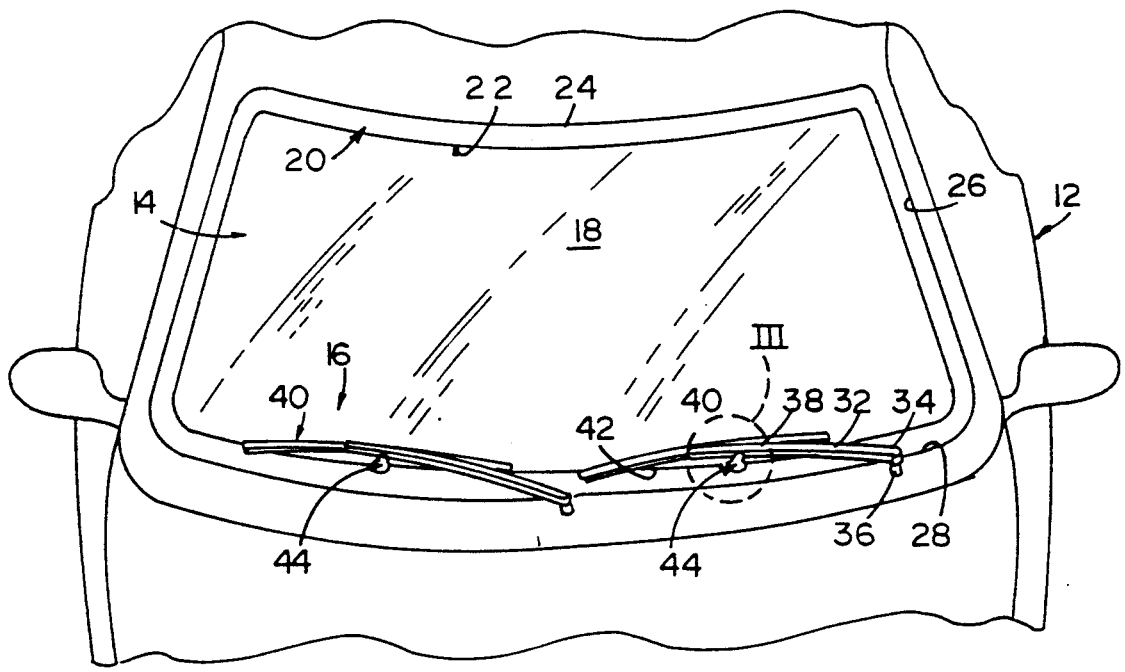
FIG. 2 is a plan view of the windshield shown in FIG. 1.

Referring to the drawing figures, like reference numerals will indicate the same or similar components, wherein FIG. 1 shows a portion of a vehicle 12 containing a modular windscreen 14 incorporating one form of the present invention in association with a wiper assembly 16. FIGS. 1–5 illustrate in greater detail the modular windscreen 14 which includes a transparent window panel 18 having an appropriate form and dimension to conform to the overall shape and design of vehicle 12. Panel 18 may be of a conventional multiply, laminated, transparent safety glass, or constructed from a transparent acrylic or other plastic material. The perimeter of the inner surface of panel 18 may have a frit coating forming a band or boarder therearound as is conventional in many automobile glass panels. Molded about at least portions of the peripheral edge of panel 18 is a seal, casing or gasket 20, described in greater detail below. Typically, as shown in FIGS. 1 and 2, gasket 20 will encapsulate the entire edge of the window panel. However, the gasket may also encapsulate only a portion of the edge such as along the lower margin of the window. Panel 18 and surrounding gasket 20 comprising the modular windscreen are adapted to be mounted in opening 22 of the vehicle from the exterior and fixed therein by an adhesive applied to the rear of the windscreen assembly. The modular windscreen is designed such that gasket 20 lies substantially flush with the leading edge of roof 24, the A-pillars 26 along the sides of the modular window, and along lower edge 28 of the windscreen with the cowl panel or leaf guard 30.

Figure 3:
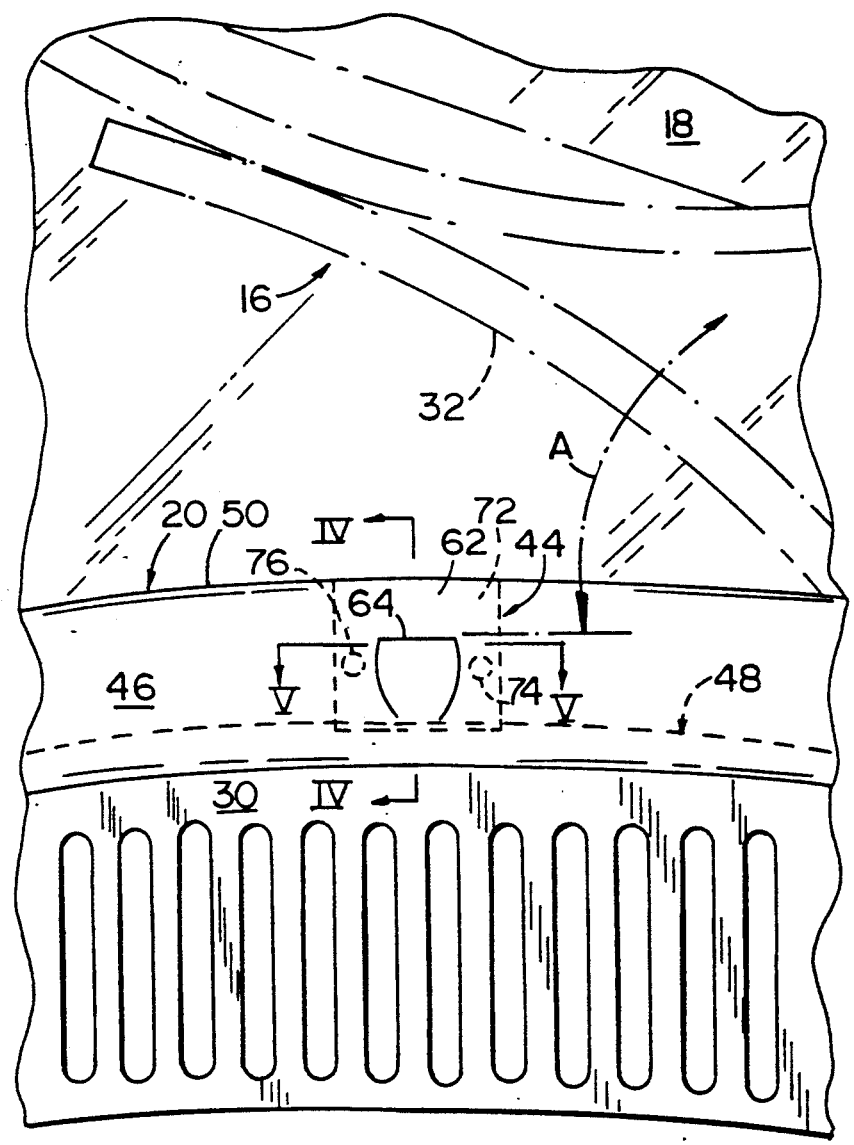
FIG. 3 is an enlarged, fragmentary plan view of area III of FIG. 2 of one embodiment of the present invention.

The vehicle has at least one wiper assembly 16, in this case a pair of spaced assemblies, each having a wiper arm 32 with first end 34 of the arm coupled to a pivot shaft 36 extending up through cowl panel or leaf guard 30. As is well known in the art, the pivot shaft is coupled to a transmission and motor (not shown) within the engine compartment to articulate the pivot shaft and wiper arm between first and second positions. Opposite end 38 of wiper arm 32 is pivotally coupled to a wiper frame 40 adapted to contain and support an elongated rubber, polymeric, or other flexible resilient wiper blade element 42. Wiper arm 32 is typically biased by a spring or the like to force the wiper frame and blade element against the window so that when the wiper arm and blade element arcuately traverse the window, as shown in FIG. 3, moisture and debris are cleaned from the window. In the rest or parked position, an arresting structure 44 located in lower portion 46 of gasket 20, engages wiper assembly 16 and prevents it from overshooting the park position and fouling on gasket 20, cowl or leaf guard 30.

Figure 4:
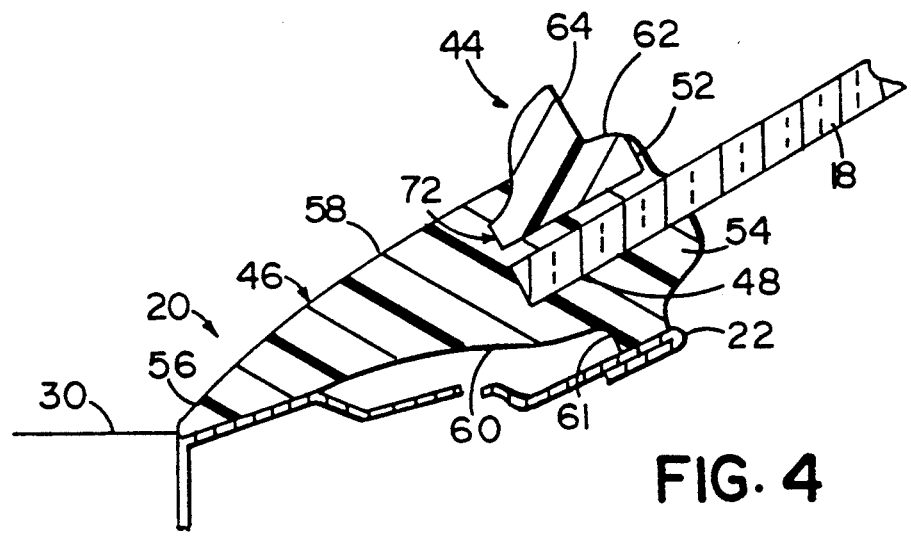
FIGS. 4 and 5 are section views taken perpendicular to each other along lines IV—IV and V—V, respectively, as shown in FIG. 3.
Figure 5:
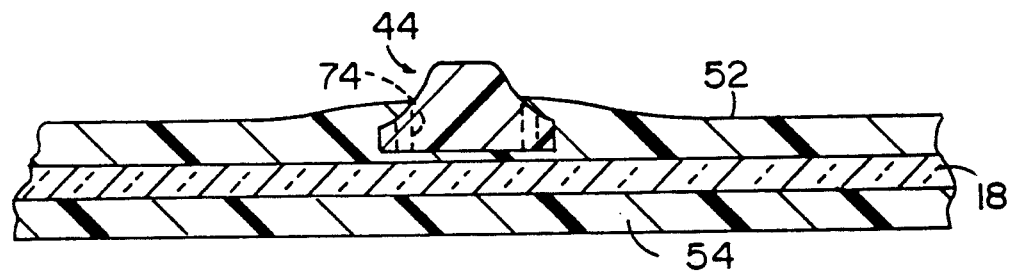

As shown in FIGS. 3–5, lower portion 46 of gasket 20 encapsulates a lower peripheral edge 48 of window panel 18. An arm 32 of wiper assembly 16 is also shown in phantom with arrow A indicating the direction the wiper articulates. The bottom of the arrow indicates the park position of the wiper arm against arresting structure 44. Inner edge 50 of gasket 46 is secured to panel 18 by securing flanges 52, 54 (FIGS. 4 and 5) which extend on either side toward the centerline of the panel. It is preferred that gasket 20 be molded from reaction injection molded (RIM) urethane about the peripheral edge of the glass or other panel. Prior to molding, the peripheral portion of panel 18 is cleaned with a solvent such as methylethylketone and preferably coated with a suitable primer to promote adhesion of the resinous moldable material thereto. Preferably, the primer is AP-134, produced by Lords of Erie, Pa.

An outer edge of gasket 20 is defined by a flange 56 which may have a variety of cross-sectional profiles as required by the opening of the vehicle. In the embodiment illustrated, the gasket has a substantial planar or slightly convex upper surface 58, and a slightly concave lower surface 60 having a ridge 61 adapted to engage the opening of the vehicle. Modular windscreen 14 is fixed within the opening by urethane or other conventionally known adhesive run in a bead along the inner surface of the glass and/or lower surface 60 of the gasket. The adhesive may also be placed along the inside surface of panel 18. The gasket and glass panel are then pressed in place into opening 22 so that the bead of adhesive flows between the vehicle and the gasket and bonds the two together.

As briefly mentioned above, it is preferred that gasket 20 be molded from a reaction injection molded (RIM) urethane directly about the peripheral edge of the panel. It should be understood that alternative materials and types of gaskets, seals or casings may be used which would be considered within the scope and spirit of the invention. Because some molding processes require high cavity pressures which can damage laminated glass panels or other constructions, the gasket may be formed off the panel on a template or blank. The gasket, incorporating the invention, may be later installed about the periphery of the panel. In those instances, alternative materials such as polyvinyl chloride or like polymeric materials may be used to form the gasket.

Referring again to FIGS. 3–5, although upper surface 58 of gasket 20 is substantially planar or slightly convex, the gasket does have molded therein, preferably at two predetermined locations, an arresting structure or pylon 44 to engage wiper assembly 16 in the park position. Arresting structure or pylon 44 extends upwardly, having a positive relief from upper surface 58 of the gasket. The dimensions and shape of the pylon may vary according to the styling of the vehicle. In general, pylon 44 has, in one form, a ramp or cam surface 62 extending from approximately the inner edge 50 of lower gasket portion 46 along upper surface 58 and terminates at a wall 64 extending perpendicular thereto. The height of wall 64 may vary but should be sufficient to engage the desired portion of wiper assembly 16 when in the park position. Similarly, the width of wall 64 (FIGS. 3 and 5) may also vary to engage more or less of the wiper assembly, as desired. For example, it may be desired to engage only arm 32 of wiper 16 so that pylon 44 and ramp or camming surface 62 would have a slightly higher profile, such as shown in FIGS. 3–5. In certain situations, it may be desirable to engage the blade element at one or more locations to prevent the blade element from traversing the surface of the gasket. This may be accomplished by situating wall 64 along a greater length of inner edge 50 of gasket portion 46, say two to three inches or more. Because the blade assembly is flexible and often as long as ten or more inches, the parking structure may be of considerable width in order to keep substantially all of blade element 42 off gasket 46 which is desirable for reaction injection molded (RIM) urethane gaskets.

If it is desired to park wiper assembly 16 so that a substantial portion, if not all, overlies the gasket, pylon 44 may be set back from inner edge 50 of gasket 46 (FIG. 4). However, as mentioned above, it is desirable that RIM urethane gaskets do not engage the blade element. For this reason, pylon 44 may engage wiper arm 32 such that ramp or cam surface 62 lifts the wiper blade by an appropriate amount, thus lifting wiper blade element 42 up and over gasket 46. The wiper assembly parked on or over gasket 46 creates a more aesthetically appealing option since the wiper assembly may blend in with the background of the gasket. It may also be desirable to create the parking structure out of a different material, particularly if the remainder of the gasket is RIM urethane, which is subject to erosion. These alternatives will be discussed in greater detail below.

In the first embodiment, shown in FIGS. 3-5, each pylon 44 is a preformed insert, placed within the mold apparatus used to form gasket 20 on panel 18 and embedded and encased by molding within the gasket during its formation. Preferably, pylon 44 is made from a variety of materials which are compatible with the RIM urethane gasket such as polypropylene. It is desirable that the pylon also be ultraviolet (UV) stable, have a high impact strength, and able to withstand a wide range in temperature, all of which are found in polypropylene.

Referring to FIGS. 3 and 5, pylon insert 44 has a substantially flat lower plate 72. The plate may be rectangular, circular, or irregular (scalloped) to provide a sufficient area to be captured by and embedded within the gasket material. The plate may have one or more perforations or apertures 74 (FIGS. 3 and 5) so the molded gasket material may pass therethrough to solidly hold the pylon. Pylon 44 extends from plate 72 to form wall 64 although it is preferred to produce more of a transition on the remaining three sides to produce a more appealing and streamlined surface for the portion exposed above the gasket. In the alternative, the transition may be gradual from the perimeter of plate 72 so that the molded material comprising lower gasket portion 46 may lap up, and thin toward the pylon.

As briefly mentioned above, pylon 44 may have a ramp or camming surface 62 to ease the wiper assembly up and over gasket portion 46 and against wall 64. The ramp may also lift wiper assembly 16 off the panel and gasket. In the alternative, wall 64 of pylon 44 may be substantially linear or ahead of inner edge 50 of gasket 46 to engage the wiper assembly before reaching the gasket.

Figure 6:
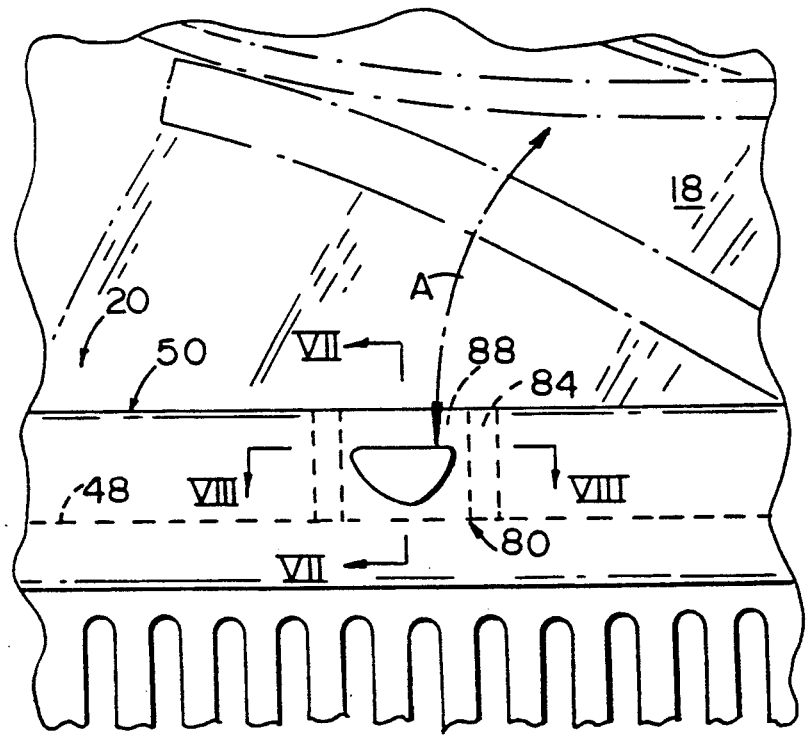
FIG. 6 is an enlarged, fragmentary plan view of an area similar to that in FIG. 3 but of another embodiment of the present invention.

FIG. 6 illustrates a second embodiment 80 of the wiper arresting pylon, again on the lower portion of modular windscreen 14. The peripheral edge 48 of panel 18 is bonded by molding using a primer such as Lord's AP-134 or the like between securing flanges 52 and 54, defining the inner edge 50 of gasket portion 46, as described above. The outer edge of gasket 20 includes a single flange 56. As in the previous embodiment, gasket 20 is adapted to secure and seal the panel in opening 22 of the vehicle while simultaneously providing a substantially flush, smooth transition from the panel to the sheet metal of the vehicle. To accomplish the flush transition, the upper surface of the gasket is substantially flat or slightly convex. The lower surface may have a variety of cross-sectional profiles depending upon the make and model of the vehicle in which the modular windscreen will be inserted. A bead of urethane or other adhesive is laid along the lower surface of the gasket and inside surface of panel 18 before the windscreen assembly is set in the opening to bond with the vehicle.

Disposed at predetermined locations in lower portion 46 of gasket 20, and extending from upper surface 58, are one or more preformed pylons 80 placed within the mold apparatus and molded within and captured in gasket portion 46. As in the previous embodiment, pylon 80 is adapted to engage wiper assembly 16 and prevent it from encroaching upon the gasket, cowl panel or leaf screen. Depending upon the desired portion of wiper assembly 16 to be engaged, the location, size or shape characteristics will vary. The particular structural characteristic of this alternate embodiment of pylon 80 will be understood by referring to FIGS. 7 and 8.

Figure 7:
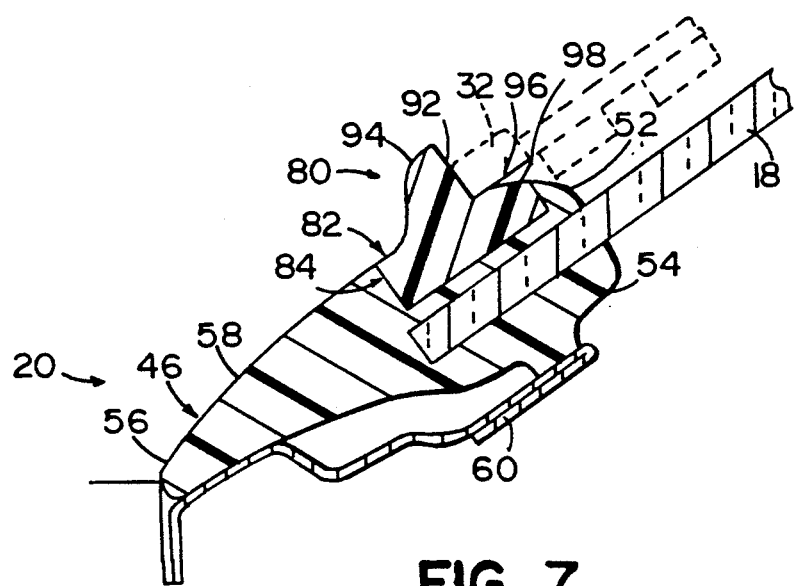
FIGS. 7 and 8 are section views taken perpendicular to each other along lines VII—VII, VIII—VIII, respectively, as shown in FIG. 6.
Figure 8:
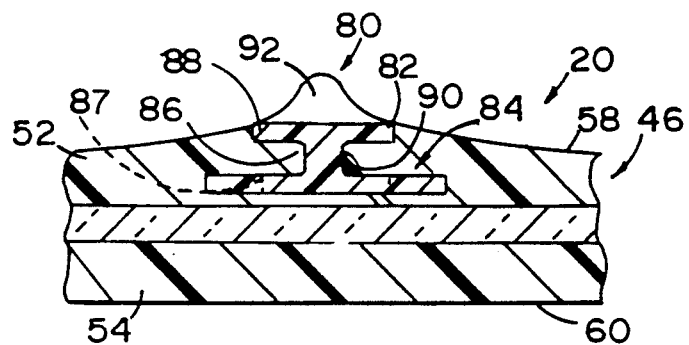

FIG. 7 is a longitudinal section view of lower portion 46 of gasket 20 illustrating the preformed pylon 80 secured within gasket 46. Upper surface 58 of gasket 46 is flush with an upper surface 82 of pylon base 84 so that pylon 80 extends above the gasket. FIG. 8 is a transverse section view of the preformed pylon illustrating flange 86 of base 84 within the gasket. Base 84 of pylon 80 may be generally described as a wide flanged I-beam, wherein a lower flange 86 is interconnected to an upper flange 88 by a rib 90. Extending from the upper surface of upper flange 88 is pylon shoulder 94 defining wall 92 for engaging the wiper assembly. Pylon shoulder 94 may be tapered along the surfaces other than wall 92 for a more appealing and streamlined structure.

In applications where it is desired to lift the wiper assembly up over gasket 46 before resting against wall 92, an edge 96 of upper flange 88 (FIG. 7) may be tapered to form a ramp 98 providing a smooth transition for the wiper assembly onto the pylon. Suitable anchoring devices such as positive structures or perforations or apertures 87 may be formed in or on flanges 86 and/or 88 of the base to receive the molded material and lock it within the gasket.

Figure 9:
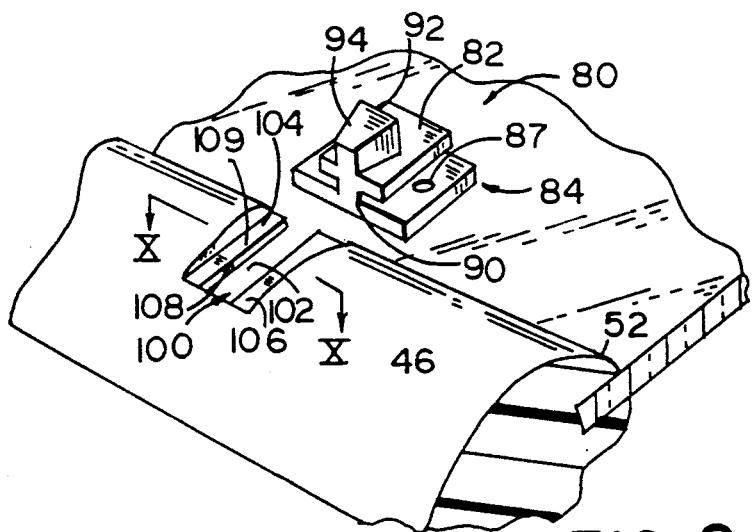
FIG. 9 is an exploded, fragmentary, perspective view of the alternate embodiment of the invention shown in FIGS. 6–8.
Figure 10:
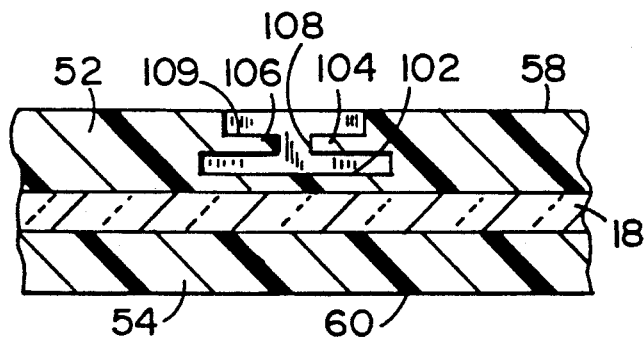
FIG. 10 is a section view of the gasket in FIG. 9, taken along line X—X and illustrating a cavity for receiving the insert.

Although the description of this embodiment of the arresting structure has been described as a preformed insert molded within the gasket, it should be understood that the wide flange I-beam configuration may be subsequently attached to the gasket after the gasket is formed such that it is slidably received by a cavity formed in the gasket during the molding process, as shown in FIGS. 9 and 10, described below.

As in the previous embodiments, the lower portion of modular windscreen 14 includes a lower peripheral edge 48 of panel 18 encased by gasket 20. Inner edge 50 of gasket 20 has a pair of securing flanges 52 and 54 which encapsulate peripheral edge 48 of the panel and extend toward a centerline thereof. As above, in order to secure a bond between securing flanges 52 and 54 of the gasket and glass panel 18, the glass periphery may be primed using a product designated AP-134, produced by Lords of Erie, Pa. Gasket 20 has an outer flange 56 producing a generally planar or slightly convex upper surface 58. As described above, lower surface 60 may be slightly concave, stepped or have another cross-sectional profile so as to rest on the sheet metal surface about opening 22.

At one or more locations along upper surface 58 of gasket 20, a cavity 100 may be formed within the gasket and extend from inner edge 50 into the gasket (FIG. 9). The cavity has a lower rectangular volume 102 (FIG. 10) to receive lower flange 86 of pylon insert 80. A pair of flanges 104 and 106, forming the upper surface of lower volume 102, are formed so as to be received in the area between upper and lower flanges 86 and 88 of the pylon. Sufficient space 108 is provided between the flanges of the cavity to accommodate rib 90. A slight recess 109 is provided in upper surface 58 of the gasket so upper surface 82 of flange 88 will lie flush therewith. The pylon may be retained within such cavity by a mechanic an adhesive such as cyanoacrylate.

Figure 11:
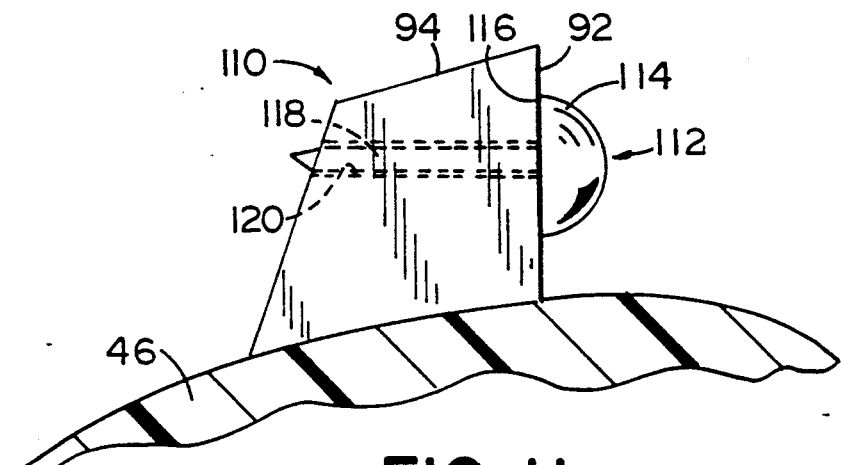
FIGS. 11 and 12 are side elevation views of generic arresting structures having shock absorbing elements.
Figure 12:
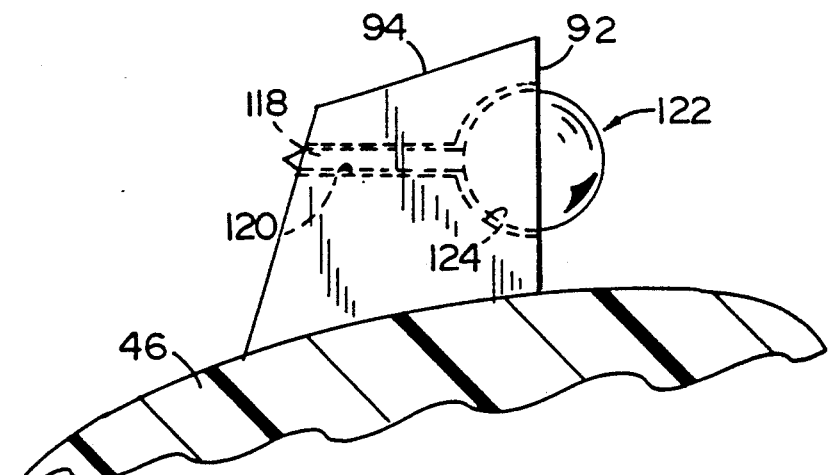

FIGS. 11 and 12 are side illustration views of a generic pylon 110 such as any of those described above. In FIG. 11, pylon shoulder 94 defining wall 92 is adapted to receive a shock absorbing means such as a bumper 112. Bumper 112 may include a hemispherical shock absorbing head 114 having a substantially flat back 116. Normal to back 116, and extending from a central point thereon, may be a post 118. Post 118 is adapted to be received within a bore 120 extending from wall 92 of the pylon to an opposite side of the shoulder. It is preferred that shock absorber 112 be constructed from an EPDM, thermoplastic rubber or similar compound such that post 118 may be stretched through bore 120, and when released, will mechanically retain back 116 against wall 92 of the pylon.

In FIG. 12, another generic pylon is shown in a side elevation view. In this embodiment, shock absorbing element 122 may be a sphere 124 formed from a similar material as described above in FIG. 13. Spherical shock absorber 124 may be disposed within a hemispherical depression 126 formed within wall 92 of the pylon. Shock absorbing element 124 may be retained within depression 126 by a suitable adhesive such as cyanoacrylate. In the alternative, a post 118 may be used as described above in relation to FIG. 11.

Other variations such as local changes in the positive relief of the gasket and/or pylon may be made to accommodate the many different makes and models of vehicles. Similarly, the arresting structures may be located along the top or side portions of the gaskets to receive the wiper assembly or confine the wiper assembly to the window. Although the above description has been made with reference to front windscreens, the application of this invention is broader in scope and may be applied to rear windows or other windows having a wiper assembly.

Though the invention has been described with respect to specific preferred embodiments thereof, many other variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. A panel assembly for a vehicle, comprising
   a panel;
   a gasket encapsulating the perimeter of said panel and having an outer surface adapted to be exposed to the exterior of the vehicle when said panel assembly is mounted therein; and
   an insert separately formed from said gasket and molded in and at least partially encapsulated by said gasket such that it extends from said outer surface, said insert including means for arresting a wiper assembly at a park position on said assembly.

2. The panel assembly of claim 1, wherein said insert includes an arresting structure protruding from said gasket and having a wall adapted to engage and stop said wiper assembly over said gasket.

3. A panel assembly for a vehicle adapted for use with a wiper assembly mounted adjacent thereto, said panel assembly, comprising:
   a panel;
   a gasket encapsulating the perimeter of said panel and having an outer surface adapted to be exposed to the vehicle exterior when mounted in the vehicle; and
   wiper arresting means, molded and integral with said gasket, for arresting a wiper assembly at a park position on said panel assembly, said wiper arresting means having means for lifting at least portions of the wiper assembly over portions of said gasket and a wall extending upwardly and away from said gasket outer surface to engage and stop said wiper assembly from traversing beyond said gasket.

4. A panel assembly, comprising:
   a panel;
   a gasket encapsulating the perimeter of said panel; and
   means integral with said gasket for arresting a wiper assembly at a park position on said panel, said means for arresting said wiper assembly including an arresting structure having a wall adapted to engage and stop said wiper assembly when idle, wherein said arresting structure is a separate member secured within a cavity formed in said gasket.

5. The panel assembly of claim 4, wherein said arresting structure further comprises a lower plate coupled to said arresting structure by a rib, said lower plate having at least one hole extending transversely therethrough.

6. The panel assembly of claim 5, wherein said arresting structure is retained within said gasket by an adhesive.

7. A window assembly for use in conjunction with a vehicular wiper assembly adapted to traverse a window panel between first and second positions, the wiper assembly having one end coupled to a propelling means and an opposite end including a wiper blade, the window assembly comprising:
   a window panel having a peripheral edge;
   an insert located adjacent said peripheral edge of said window panel; and
   a gasket encapsulating at least portions of said peripheral edge of said window panel for mounting and sealing said window panel in a vehicle body opening, said gasket having an an outer surface exposed to the exterior when mounted in a vehicle and at least partially surrounding said insert and retaining said insert adjacent said window panel in said gasket outer surface for arresting the traverse of said wiper assembly.

8. The window assembly of claim 7, wherein said insert includes:
   a pylon extending from said gasket and having a wall; and
   a camming surface for engaging said wiper assembly and directing said wiper assembly against said wall.

9. The window assembly of claim 7, wherein the wiper assembly is of the type including a wiper arm; and said insert adapted to engage the wiper arm.

10. The window assembly of claim 8, wherein said camming surface engaging said wiper assembly lifts the wiper blade off said window panel when in said first position.

11. The window assembly of claim 7, wherein said insert is adapted to engage the wiper blade of the wiper assembly.

12. The wiper assembly of claim 7, wherein said gasket is molded on said window panel from a reaction injection molded urethane.

13. The wiper assembly of claim 7, wherein said molded gasket is from polyvinyl chloride.

14. An apparatus for arresting the traverse of, supporting and positioning a windshield wiper assembly when idle, comprising in combination:
- a window panel having a peripheral edge, and an exterior and interior surface;
- a molded gasket encapsulating the peripheral edge of said window panel for mounting and sealing said window panel in a vehicle body opening, said molded gasket having an exterior surface, first and second securing flanges extending from said peripheral edge toward a center of said window panel on said interior and exterior surface, and a third flange extending away from said window panel;
- engaging means extending from said exterior surface of said molded gasket for engaging the windshield wiper assembly when idle and preventing said wiper assembly from contacting said molded gasket; and
- means disposed within said engaging means for absorbing an impact with said wiper assembly.

15. The apparatus as recited in claim 14, wherein said engaging means includes:
- a pylon having an arresting wall for engaging the wiper assembly; and
- a camming surface for lifting the wiper assembly.

16. The apparatus as recited in claim 15, wherein said pylon is a preformed insert encapsulated within said molded gasket.

17. The apparatus as recited in claim 15, wherein said pylon is made from a high-impact, ultraviolet stable material compatible with said molded gasket.

18. A window assembly for use in combination with a vehicle body having a first opening for receiving a window assembly therein, and at least one wiper assembly having an arm coupled at one end to a propelling means and at a second end to a wiper blade assembly, the wiper assembly adapted to be articulated between a first and second position, comprising in combination:
- a window panel;
- a gasket molded about and encapsulating at least a portion of the peripheral edge of said window panel for mounting and sealing said window panel in said opening of said vehicle, said gasket having an upper surface adapted to be exposed to the exterior when said window assembly is mounted in the vehicle body and an inner and an outer edge; and
- an arresting structure insert at least partially encapsulated by and extending from said upper surface of said molded gasket and having a wall adapted to engage and arrest the articulation of the wiper assembly at the first position.

19. The window assembly of claim 18, wherein said arresting structure insert further includes at least one pylon having an arresting wall adapted to engage said wiper assembly when in said first position.

20. The wiper assembly of claim 19, wherein said arresting structure insert further includes a camming surface, disposed between said arresting wall and said inner edge of said gasket, for lifting said wiper assembly off said window panel when in said first position.

21. The window assembly of claim 18, wherein said arresting structure insert extending from said gasket is adapted to engage said arm of said wiper assembly when in said first position.

22. The window assembly of claim 18, wherein said arresting structure insert extending from said gasket is adapted to engage said wiper blade assembly when in said first position.

23. The window assembly of claim 22, wherein said arresting structure insert extending from said gasket is adapted to engage said wiper blade assembly at said inner edge of said gasket when said wiper assembly is in the first position.

24. The window assembly of claim 22, wherein said arresting structure insert extending from said gasket is adapted to engage said wiper blade assembly between said inner and outer edge of said gasket.

25. The window assembly of claim 18, wherein said arresting structure insert extending from said gasket includes a preformed insert having a base portion encapsulated within said gasket and retained therein; and
- a pylon having an arresting wall extending from said base and from said gasket.

26. A panel assembly for a vehicle, comprising:
- a panel;
- a gasket molded from a polymeric material and disposed about at least a portion of the perimeter edge of said panel and having an outer surface adapted to be exposed to the exterior of the vehicle when said panel assembly is mounted therein; and
- an arresting structure insert molded in and at least partially extending from said gasket outer surface and adapted to engage a wiper assembly at a parked position on said assembly, said arresting structure insert formed separately from said gasket and embedded therein during molding, whereby said arresting structure forms an integral part of said gasket.

27. A panel assembly, comprising:
- a panel;
- a gasket molded from a polymeric material and disposed about at least a portion of the perimeter edge of said panel; and
- an arresting structure disposed in and extending from said gasket and adapted to engage a wiper assembly, said arresting structure being an insert formed separately from said gasket, said insert being disposed and secured in a cavity formed in said gasket.

28. A panel assembly, comprising:
- a panel;
- a gasket disposed about at least a portion of the peripheral edge of said panel and having a cavity along an outer surface thereof; and
- an arresting structure disposed in said cavity and adapted to halt the travel of a wiper assembly.

29. The panel assembly of claim 28, wherein said arresting structure is retained in said cavity by an adhesive.

30. The panel assembly of claim 28, wherein said arresting structure includes a flange oriented generally parallel to said panel and interconnected to a base of said arresting structure.

31. The panel assembly of claim 3, wherein said wiper arresting means includes:
- a pylon extending from a surface of said gasket;
- a camming surface disposed between said wall and an inner edge of said gasket for directing said wiper assembly against said wall.

32. The panel assembly of claim 31, wherein said camming surface lifts said wiper assembly off said panel and gasket.

33. The panel assembly of claim 32, wherein said wiper arresting means engages a wiper blade of said wiper assembly.

34. The panel assembly of claim 32, wherein said wiper arresting means engages a wiper arm of said wiper assembly.

* * * * *

UNITED STATES PATENT AND TRADEMARK OFFICE
CERTIFICATE OF CORRECTION

PATENT NO. : 5,263,759
DATED : November 23, 1993
INVENTOR(S) : Brodie et al.

It is certified that error appears in the above-indentified patent and that said Letters Patent is hereby corrected as shown below:

Column 3, line 8;

"multiply" should be --multi-ply--.

Signed and Sealed this

Second Day of August, 1994

BRUCE LEHMAN

Attest:

Attesting Officer

Commissioner of Patents and Trademarks